United States Patent
Lopez et al.

(10) Patent No.: US 7,184,932 B1
(45) Date of Patent: Feb. 27, 2007

(54) RELIABILITY PREDICTION FOR COMPLEX COMPONENTS

(75) Inventors: Leoncio D. Lopez, Escondido, CA (US); David K. McElfresh, San Diego, CA (US); Dan Vacar, San Diego, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 11/345,557

(22) Filed: Jan. 31, 2006

(51) Int. Cl.
*G06F 19/00* (2006.01)

(52) U.S. Cl. .................. 702/185; 714/25; 438/14

(58) Field of Classification Search ......... 702/185, 702/182–184, 188; 714/25, 48; 438/14, 438/17
See application file for complete search history.

(56) References Cited

U.S. PATENT DOCUMENTS

| | | | |
|---|---|---|---|
| 6,076,411 A * | 6/2000 | Horvath | 73/866 |
| 6,978,226 B2 * | 12/2005 | Kanehira et al. | 702/183 |
| 2002/0116083 A1 * | 8/2002 | Schulze | 700/108 |
| 2003/0105544 A1 * | 6/2003 | Kauffman et al. | 700/109 |

* cited by examiner

*Primary Examiner*—Edward Raymond
(74) *Attorney, Agent, or Firm*—Martine Penilla & Gencarella, LLP

(57) ABSTRACT

A method for assessing a reliability of a complex component having a plurality of similar subcomponents is described. The complex component is divided into a plurality of component parts, each component part including at least one of the subcomponents. Specification ranges are identified for measured variables within which the component parts are considered to be operating within specification. The complex component is subjected to a reliability test and reliability data is obtained for the component parts by comparing the measured variable for each of the component parts with the specification ranges to determine failure times. A system and machine readable medium embodying program instructions is also provided.

20 Claims, 4 Drawing Sheets

RELIABILITY PREDICTION FOR COMPLEX COMPONENTS

BACKGROUND

Accurately predicting the reliability and remaining life of complex components is of paramount importance to designing, building, and fielding highly reliable computer systems. Sockets, interposers, Vertical Cavity Surface-Emitting Laser (VCSEL) arrays and other complex components each consist of many similar or substantially physically identical sub-components, all or most of which must work consistently for the system in which they are installed to work. Although physically substantially identical, in some instances the subcomponents may perform different functions and be subjected to different operating conditions (e.g. AC voltage for signal, DC voltage for power). Because subcomponents are exposed to differing operating conditions, they may also be expected to have differing reliability expectations.

The traditional approach for the reliability analysis of complex components assumes that the sub-components have independent and identically distributed failures. After performing accelerated tests, the results are fitted to a statistical distribution, extrapolating distribution parameters, confidence intervals and trends from the data. Only the time to first sub-component failure is considered. As a result, current methods for assessing the reliability and remaining life of complex components have been inadequate. Specifically, prior methods analyze the complex component as a whole, estimating the reliability from accelerated tests that record the time to first failure using component level reliability analysis tools such as Weibull and Lognormal distribution plotting. In the context used by prior methods a failure is defined as an instance wherein a critical sub-component is out of a predetermined range for acceptable operation. Such an approach has required an otherwise unnecessarily large sample size and longer test time requirements. By ignoring information ascertainable from a system-view of the complex component, useful information about actual field reliability can be overlooked and may lead into making incorrect assessments of reliability and reliability trends. The useful information that is ignored may include intermittent and recovery behavior, multiple subcomponent failures, and trends which combined may provide data about field reliability and remaining life.

For example, in a prior approach to estimating the reliability of a complex component, accelerated tests were performed, and the time-to-first sub-component failure was recorded for each complex component tested. The resulting data was plotted using Weibull or Lognormal distributions, and the distribution parameters were estimated by least squares, Maximum Likelihood Estimate (MLE), or other methods. Any subsequent failures, changes, intermittent behavior, and/or degradation of the first failed sub-component and other sub-components were ignored. Because of the key information that is ignored in this prior approach and given that sub-components can have time dependent and time-varying behavior, potential advantages of competing technologies is not accurately determined.

There is therefore a need for a method of accurately establishing a reliability profile for complex components that does not ignore the variations among the individual sub-components, sub-component functions and performance.

SUMMARY

Broadly speaking, the present invention fills these needs by providing a method for predicting the reliability of complex components and allowing the estimation of remaining life under operating conditions.

It should be appreciated that the present invention can be implemented in numerous ways, including as a process, an apparatus, a system, a device, or a method. Several inventive embodiments of the present invention are described below.

In one embodiment, a method is provided for assessing a reliability of a complex component having a plurality of similar subcomponents. The complex component is divided into a plurality of component parts, each component part including at least one of the subcomponents. Specification ranges are identified for measured variables within which the component parts are considered to be operating within specification. The complex component is subjected to a reliability test and reliability data is obtained for the component parts by comparing the measured variable for each of the component parts with the specification ranges to determine failure times.

In another embodiment, a computer readable medium having program instructions for assessing a complex component for reliability is provided. The computer readable medium embodies program instructions for receiving reliability data from a probe, the reliability data includes periodic measurements of a plurality of component parts of the complex component, each of the component parts including at least one subcomponent, the subcomponents being physically similar, possibly having functional and operational environment differences. Program instructions are provided for comparing the periodic measurements to a specification range within which the component parts are considered to be operating within specification. In addition, program instructions are provided for identifying failure times from the periodic measurements, each of the failure times being a time interval within which one of the component parts operates outside of the specification range.

In yet another embodiment, a computer implemented system for assessing a reliability of a complex component is provided. The system includes a bus, a memory, a user interface configured to present output to a user and accept commands from a user, a probe in communication with the memory for receiving measurements from a device under test (DUT), and a processor. The processor is in communication with the memory and the user interface through the bus. The processor is operable to receive instructions from the memory which, when executed by the processor, cause the processor to perform a method. In the method, the processor receives data from the probe, the data including periodic measurements of a plurality of component parts of the complex component. Each component part includes at least one subcomponent, the subcomponents being physically similar, but possibly having functional and operational environment differences. The processor compares the periodic measurements to a specification range within which the component parts are considered to be operating within specification. The comparison yields failure times from the periodic measurements, each failure time being a time interval within which one of the component parts operates outside of the specification range.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

It should be appreciated that the present invention considers that complex components are made of sub-components that may not be identical in form, shape, function, performance, or operating conditions, and therefore cannot be accurately modeled by simply using the time to first failure. It is stated that system-level reliability tools are a proper approach to analyze complex components. Counting process, Homogeneous Poisson Process (HPP), Non-Homogeneous Poisson Process (NHPP), Markov Chains, Time Dependent Reliability (TDR), Mean Cumulative Function (MCF) and Reverse Arrangement Test (RAT) are just some of the powerful techniques that can be used to analyze complex components and allow the proper estimation of reliability, trends, behavior, and remaining life. The time of failure of all sub-components, intermittent behavior, degradation, failure order, and times between failures are all considered with this approach.

Figure 1:
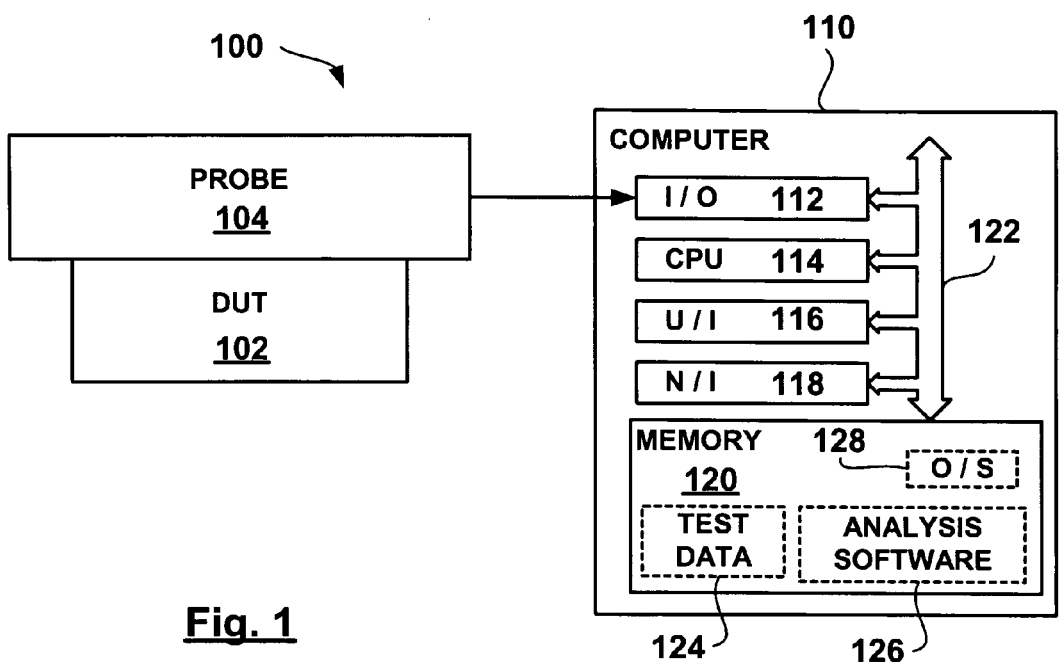
FIG. 1 presents a schematic drawing of an exemplary test apparatus.

FIG. 1 presents a schematic drawing of an exemplary test apparatus 100. Test apparatus 100 includes a device under test (DUT) 102, which includes a complex component. A complex component is a part that includes a large number of similar subcomponents. An example of a complex component is an integrated circuit (IC) socket having a large number of connections, each connection being physically similar to the other connections. Test apparatus 100 includes a probe 104 in communication with DUT 102 for measuring the operability of subcomponents of DUT 102. In one embodiment, probe 104 measures each subcomponent individually. In another embodiment, DUT 102 is divided into a number of component parts, each having more than one subcomponent, but none of the component parts having any subcomponent in common. In this embodiment, probe 104 measures the operability of each component part.

Figure 2:
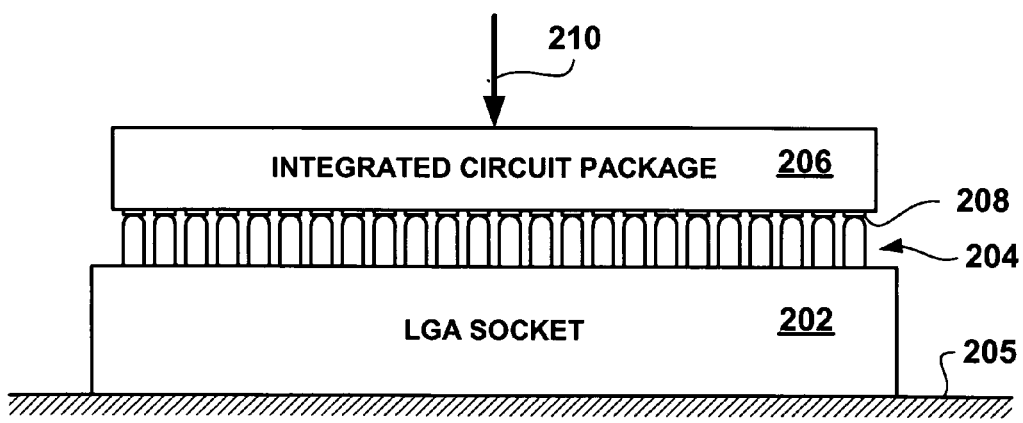
FIG. 2 shows an exemplary integrated circuit (IC) socket that is suitable for testing by test apparatus of FIG. 1.

FIG. 2 shows an exemplary IC socket 202 that is suitable for testing by test apparatus 100. IC socket 202 is a land grid array (LGA) socket having a plurality of pins 204, each of which may be supported by a spring wire (not shown) within IC socket 202. Each pin 204 is positioned for contacting a corresponding land 208 on a counterpart IC package 206. IC socket 202 is mounted to a printed circuit board 205 which includes electrical traces (not shown) for transmitting signals from pins 204 to other locations on circuit board 205. In normal use, IC package 206 includes an IC having a plurality of electrical connections to an array of lands 208. A force represented by arrow 210 places pressure between pins 204 and lands 208 to provide an electrical contact between pins 204 and lands 208. During testing, IC package 206 is replaced by probe 104 (FIG. 1) and pins 202 are likewise connected to probe 104 via printed circuit board 205 for testing the electrical resistance between pins 204 and lands 208.

Another example of a complex component (not shown) is a digital micromirror device (DMD), which are found in digital light processors (DLPs) for generating a projection of a digital image. A DMD is essentially a large two-dimensional matrix of micromirrors, each individually controlled by a microactuator. A probe may include a machine vision system for detecting light reflected by the micromirrors for individually measuring the operability of each subcomponent micromirror.

Returning to FIG. 1, probe 104 is in electronic communication with computer 110 by way of an input/output interface 112. Computer 110 also includes a central processing unit (CPU) 114, a user interface 116, a network interface 118, and memory 120 all in communication via a bus 122. Memory 120 may include one or more of a variety of different memories including random access memory (RAM) and non-volatile mass storage, e.g., a disk drive. Furthermore, memory 120 may include memory that is connected via a network connection and network interface 118 for remote storage. In one embodiment, memory 120 includes an operating system 128, and analysis software 126. The test data 124 is received from probe 104 via I/O 112 and bus 122 and stored in memory 120. Analysis software 126 operates in conjunction with operating system 128 for processing and presenting data to users via user interface 116.

Figures 3, 4:
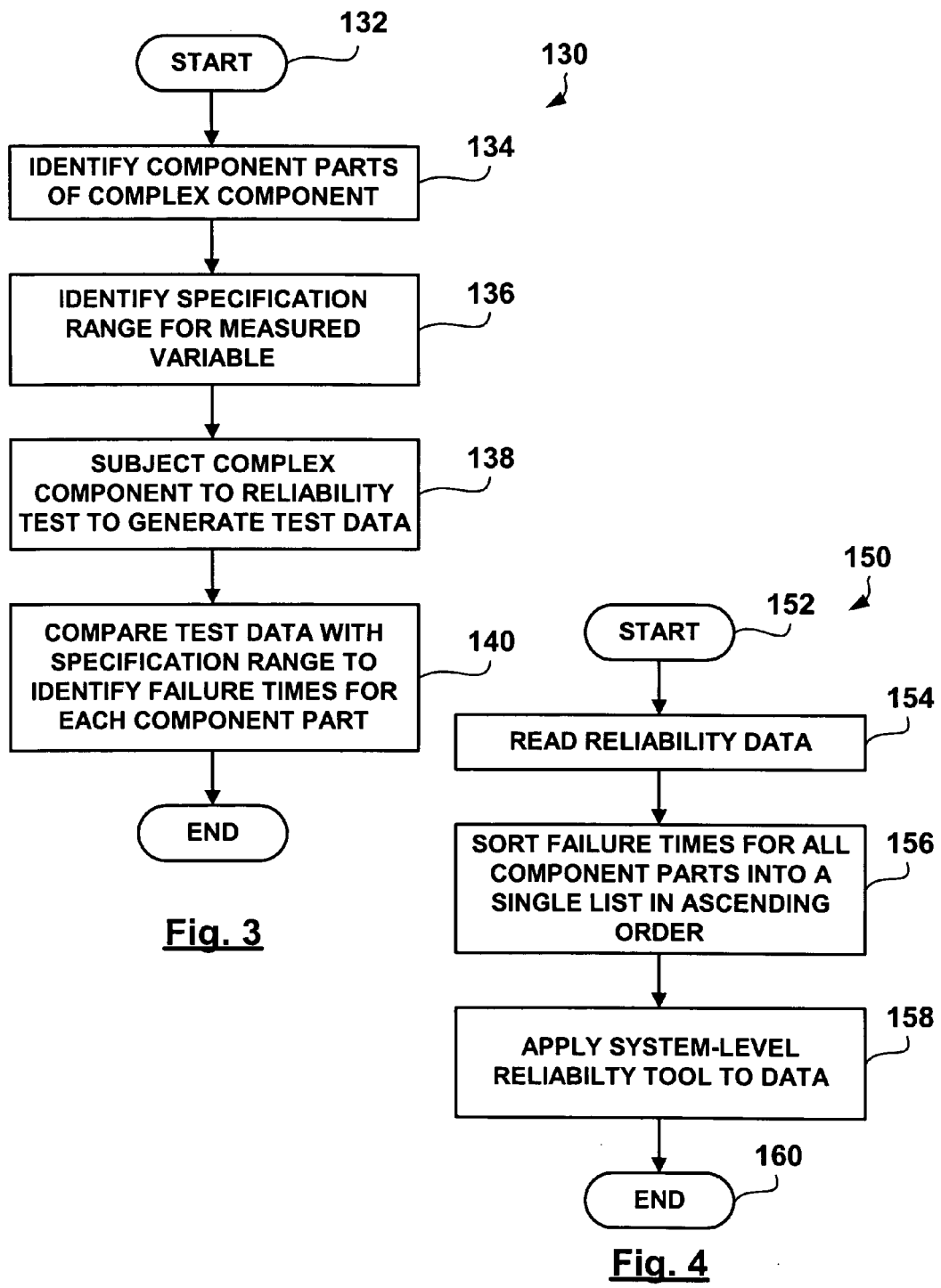
FIG. 3 presents a flowchart depicting an exemplary procedure for obtaining and analyzing test data.
FIG. 4 shows a flowchart depicting an exemplary procedure for analyzing reliability data to identify a reliability characteristic.

FIG. 3 presents a flowchart 130 depicting an exemplary procedure for obtaining and analyzing test data. The procedure begins as indicated by start block 132 and proceeds to operation 134 wherein component parts of the complex component are identified. Component parts may be made up of individual subcomponents or groups of subcomponents. Thus, as used herein, the term, "component part" refers a part of the complex component having one or more subcomponent, but less than all subcomponents of the complex component. After identifying component parts of the complex component, the procedure flows to operation 136.

In operation 136, a specification range is identified for establishing operation within acceptable parameters. Therefore, a device operating "within specification" will operate with the measured variable being within the specification range. Depending on the DUT, one or more variables may be measured for each subcomponent to determine its level of operability. For each measured variable, a range of acceptable values is identified which will establish the particular subcomponent being measured as functioning normally so long as the measured variable falls within that range. For example, a threshold level of resistance for a contact in the LGA socket of FIG. 2 may be identified, wherein the contact must provide a level of resistance below the specified threshold level to establish normal operation. If the resistivity increases above the specified threshold, then the particular component part is identified as having failed. It should also be noted that it is possible that the component part either works or does not work, e.g., in the case of a DMD. In this case, the variable may be a Boolean (true or false) value and the specification range will consist of one of the Boolean values. Once the failure criteria is established for each component part, the procedure flows to operation 138.

In operation 138, the complex component is subjected to a reliability test. Reliability tests typically involve rapidly exercising the DUT through many cycles of operation, and may involve exposing the DUT to extreme environmental or operational stresses. For example, the DUT may be placed in a test chamber which rapidly heats and cools the device to simulate many operation cycles compressed in time for the purpose of predicting long-term reliability of a particular design represented by the DUT. During testing, as represented in FIG. 1, probe 104 continuously or periodically measures a particular parameter of each component part. This data is then sent to computer 110 where it is stored in memory 120. After testing, the procedure of FIG. 3 proceeds to operation 140.

In operation 140, test data from the DUT is compared with the specification range identified in operation 136 to determine specific times of failure for each component part. It should be noted that a failure time may be an identification of an interval of time during which a component part failed, e.g., hour 31, or at ten minutes, 53 seconds. However, a failure time can also be expressed as a test cycle number, e.g., when a part is subjected to repetitive test cycles, and the component part fails at a particular cycle number. It is noted that some component parts may fail multiple times and others once or not at all. These failure times represent the raw reliability data that can then be analyzed to determine reliability characteristics of the DUT. After generating this reliability data, the procedure ends as indicated by end block 142.

Some of the techniques that can be used for the rich extraction of reliability information in complex components are point processes. Point processes are models used in the analysis of repairable units where failures are distributed over time. Some example point processes are the Homogeneous Poisson Process (constant failure rate over time), the Non-Homogeneous Poisson Process (variable failure rate over time), and the Counting Process. Other techniques include Markov Chains, Time Dependent Reliability (TDR), Mean Cumulative Failure (MCF), and Reverse Arrangement Test (RAT).

Sample data from an accelerated stress test of complex components that completed 1500 hours is shown in Table 1. The table represents failures from 10 complex components (numbered 1–10) that were subjected to accelerated testing. For each complex component the failure times represent the failure of one or more sub-components during the test. Repeated failure times represent multiple sub-component failures at the same time.

TABLE 1

| COMP. | FAILURE TIMES (HOURS) |
|---|---|
| 1 | 140, 570, 570, 910, 911, 952, 953, 955, 960, 1078, 1080, 1095 |
| 2 | 615, 615, 950, 950, 955, 1440 |
| 3 | 140, 140, 600, 600, 615, 951, 951, 951, 1092, 1248 |

TABLE 1-continued

| COMP. | FAILURE TIMES (HOURS) |
|---|---|
| 4 | 360, 950, 950, 950, 950, 950, 950, 951, 951, 951, 955, 956, 1095, 1100 |
| 5 | 530, 950, 950, 950, 950, 1295 |
| 6 | 950 |
| 7 | 785, 950, 950, 950, 1095, 1095 |
| 8 | 615, 615, 950, 950, 950, 950 |
| 9 | 140, 950, 950, 950, 950, 1095 |
| 10 | 615, 785, 950, 950, 950, 950, 955, 955, 955, 955, 955, 1095 |

FIG. 4 shows a flowchart 150 depicting an exemplary procedure for analyzing the sample reliability data shown in Table 1, allowing to identify reliability characteristics and trends. The procedure begins as indicated in start block 152 and flows to operation 154 wherein reliability data is read. The reliability data includes failure times of a plurality of component parts of one or more DUTs. After reading the reliability data, the procedure flows to operation 156.

In operation 156, the failure times or cycles to failure for all component parts of a given complex component are sorted in ascending order into a single list. Each failure time or cycle represents time or cycles elapsed since the beginning of the test at which a component part operated out of specification. In one embodiment, time to failure is listed in hours such that the number one ("1") refers to the first hour of the test. In another embodiment, the time to failure identifies a test cycle number. Since the failure times of all the component parts are combined into a single list, it is possible for a particular time to be listed multiple times.

Figure 5:
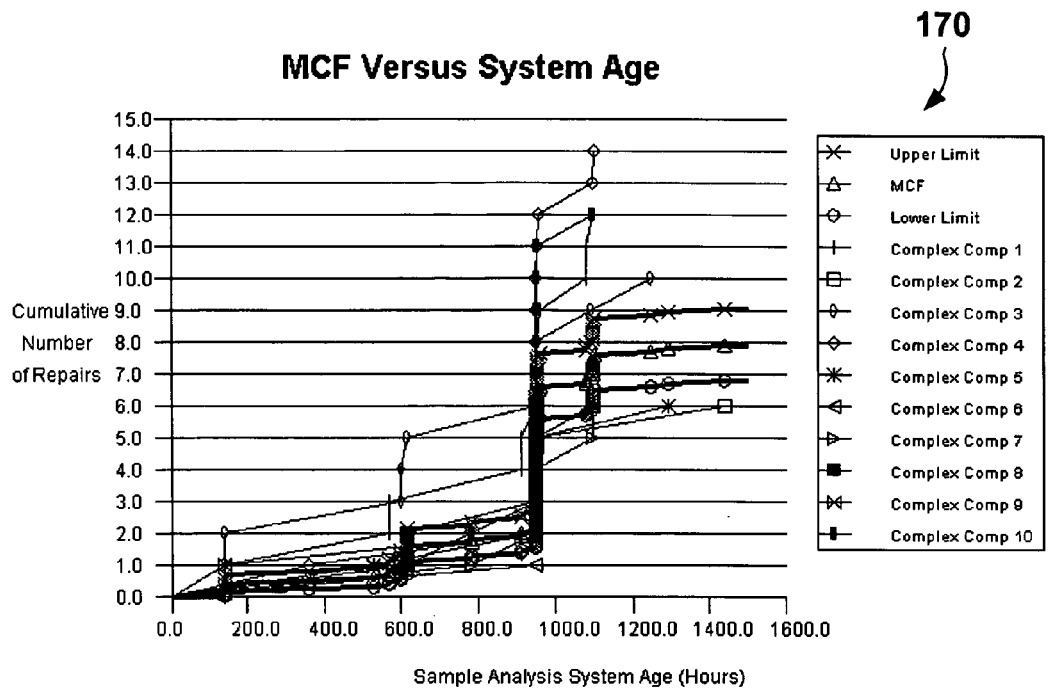
FIG. 5 shows a mean cumulative function plot representing failure data for each of ten complex components that were tested.
Figure 6:
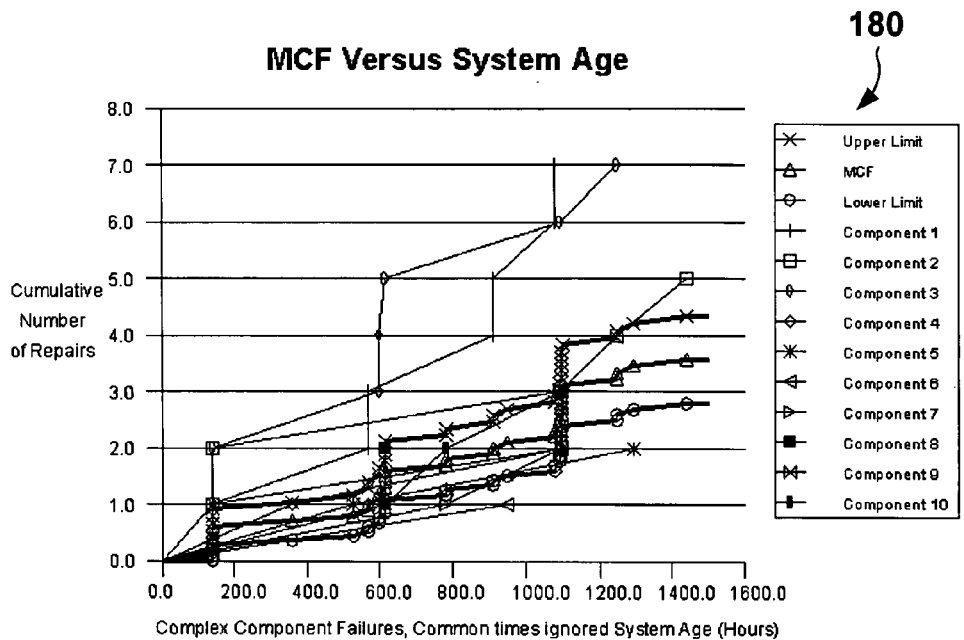
FIG. 6 is a modified plot showing data from the FIG. 5, with an anomalous event removed.

After sorting the failure times in operation 156, the procedure flows to operation 158 wherein one of the system-level reliability tools is applied. In this example the mean cumulative function is plotted for each complex component, showing the distribution of failure times and trends. The mean cumulative function (MCF) is a plot that identifies the cumulative number of observations up to a given time. FIG. 5 shows an exemplary mean cumulative function plot 170 representing reliability data for each of the ten complex components listed in the Table 1. In addition a mean cumulative function line (mean of all samples) is calculated for all 10 complex components with an upper limit and lower limit. For the MCF, the y-axis position of the graph corresponds to a total number of failures divided by the sample size (ten, in this example) up to the time indicated on the x-axis. FIG. 6 is a modified plot 180 showing data from the Table 1 above, but removing all failures at hour 950, which is deemed to be an anomalous event. After plotting the data, the procedure ends as indicated by end block 160.

Figure 7:
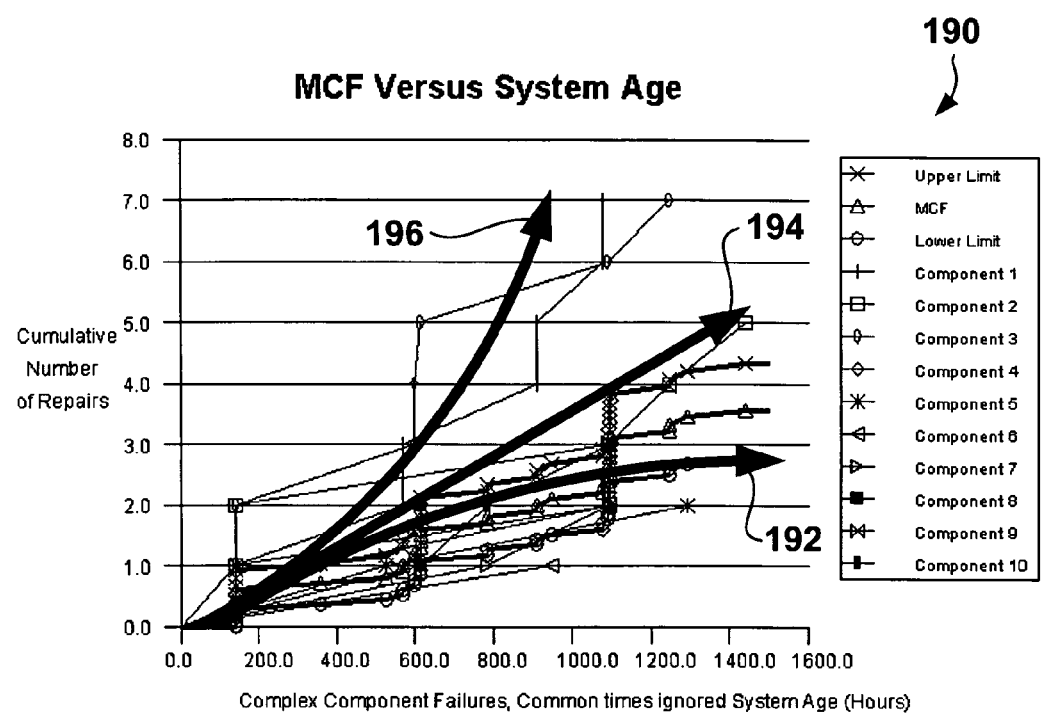
FIG. 7 shows the modified plot of FIG. 6 with exemplary trend arrows representing an improving trend, a constant failure rate trend, and a worsening.

Once the mean cumulative function plot and/or MCF of the test data is created, the trends can be analyzed, e.g., using a reverse arrangement test (RAT) to determine whether the complex component reliability improves with time, stays the same, or gets worse. FIG. 7 shows the modified plot of FIG. 6 with exemplary trend arrows 192, 194, and 196 representing an improving trend, a constant failure rate trend, and a worsening trend, respectively. These characteristics could be an important factor when comparing competing designs. It should be noted that the exemplary data presented in the Table above and graphically in FIGS. 5, 6, and 7 is provided for illustration purposes only and would not be sufficient to draw any conclusions regarding overall reliability of a particular complex component. However, one can see how the significantly more information is made available by treating the complex component as a system rather than as a single element that either passes or fails.

By analyzing complex components as a system of subcomponents as described herein, the rich information from subsequent failures, intermittent failures, and recovery behavior can be analyzed to provide a much more accurate estimate of real reliability. Using analysis techniques such as time dependent reliability (TDR) and accounting for redundant components whose failures alone do cause the complex component to fail, may lead to a much more precise estimate of the actual field reliability. In addition, the approach described herein allows for smaller sample sizes and shorter times to be used to establish reliability since each complex component may consist of hundreds to thousands of individual subcomponents, which each may be a sample for estimating reliability.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium may include an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for assessing a reliability of a complex component, the complex component comprising a plurality of similar subcomponents, the method comprising:
    dividing the complex component into a plurality of component parts, each of the component parts including at least one of the subcomponents;
    identifying a specification range for a measured variable within which the component parts are considered to be operating within specification;
    subjecting the complex component to a reliability test, the measured variable being monitored during the reliability test; and
    identifying failure times by comparing the measured variable with the specification range, each of the failure times being an interval during which the measured variable was not within the specification range for a particular one of the component parts.

2. The method of claim 1, wherein each of the component parts contains only a single one of the subcomponents.

3. The method of claim 1, wherein each of the component parts contains a plurality of the subcomponents.

4. The method of claim 1, wherein the measured variable is Boolean and the specification range is a value of the measured variable indicating that the component part is operational.

5. The method of claim 1, further comprising:
    grouping the failure times into a single list;
    sorting the list in ascending order;
    plotting a graph characterizing a reliability of the complex component, the graph having an x-axis corresponding to time and a y-axis corresponding to a number of failures, wherein for each of a plurality of time intervals identified along the x-axis, a y-axis position of the graph indicates a number of failures up to that time.

6. The method of claim 5, further comprising removing anomalous data from the reliability data.

7. The method of claim 5, further comprising identifying a failure trend, the failure trend being characterized as having one of an increasing failure rate, a decreasing failure rate, or a constant failure rate.

8. The method of claim 1, further comprising testing a plurality of complex components, combining the failure times from the plurality of complex components and plotting a graph characterizing the combined reliability data wherein for each time interval identified along an x-axis, a y-axis position of the graph indicates a total number of failures up to that time interval divided by a number of complex components in the plurality of complex components, the graph providing a mean cumulative function (MCF).

9. A computer readable medium having program instructions for assessing a complex component for reliability, the computer readable medium comprising:
    program instructions for receiving data from a probe, the data comprising periodic measurements of a plurality of component parts of the complex component, each of the component parts including at least one subcomponent, the subcomponents being substantially identical to one another;

program instructions for comparing the periodic measurements to a specification range within which the component parts are considered to be operating within specification; and program instructions for identifying failure times from the periodic measurements, each of the failure times being a time interval within which one of the component parts operates outside of the specification range.

10. The computer readable medium of claim 9, wherein each of the component parts contains only a single one of the subcomponents.

11. The computer readable medium of claim 9, wherein each of the component parts contains a plurality of the subcomponents, and none of the component parts have any of the subcomponents in common.

12. The computer readable medium of claim 9, further comprising:

program instructions for grouping the failure times into a single list;

program instructions for sorting the list in ascending order; and program instructions for plotting a graph characterizing a reliability of the complex component, the graph having an x-axis corresponding to time and a y-axis corresponding to a number of failures, wherein for each of a plurality of time intervals identified along the x-axis, a y-axis position of the graph indicates a number of failures up to the corresponding time interval.

13. The computer readable medium of claim 12, further comprising program instructions for identifying a failure trend, the failure trend being characterized as having one of an increasing failure rate, a decreasing failure rate, or a constant failure rate.

14. The computer readable medium of claim 9, further comprising testing a plurality of complex components, combining the failure times from the periodic measurements for each of the complex components, and plotting a graph characterizing the combined failure times wherein for each time interval identified along an x-axis, a y-axis position of the graph indicates a number of failures up to the corresponding time interval divided by a number of complex components in the plurality of complex components, thereby providing a mean cumulative function (MCF).

15. A computer implemented system for assessing a reliability of a complex component, the system comprising:
a bus;
a memory;
a user interface configured to present output to a user and accept commands from a user;
a probe in communication with the memory for receiving measurements from a device under test (DUT); and
a processor in communication with the memory and the monitor through the bus, the processor operable to receive instructions which, when executed by the processor, cause the processor to perform a method comprising:

receiving data from the probe, the data comprising periodic measurements of a plurality of component parts of the complex component, each of the component parts including at least one subcomponent, the subcomponents being substantially identical to one another;

comparing the periodic measurements to a specification range within which the component parts are considered to be operating within specification; and identifying failure times from the periodic measurements, each of the failure times identifying a time interval within which one of the component parts operates outside of the specification range.

16. The computer implemented system of claim 15, wherein each of the component parts contains only a single one of the subcomponents.

17. The computer implemented system of claim 15, wherein each of the component parts contains a plurality of the subcomponents.

18. The computer implemented system of claim 15, wherein the method further comprises:

grouping the failure times into a single list;

sorting the list in ascending order; and plotting a graph characterizing the reliability data, the graph having an x-axis corresponding to time and a y-axis corresponding to a number of failures, wherein for each of a plurality of time intervals identified along the x-axis, a y-axis position of the graph indicates a number of failures up to the time interval.

19. The computer implemented system of claim 18, wherein the method further comprises identifying a failure trend, the failure trend being characterized as having one of an increasing failure rate, a decreasing failure rate, or a constant failure rate.

20. The computer implemented system of claim 15, wherein the method further comprises:

receiving reliability data from a plurality of complex components;

combining the failure times from the periodic measurements for each of the complex components; and plotting a graph characterizing the combined failure times wherein for each time interval identified along an x-axis, a y-axis position of the graph indicates a number of failures divided by a number of complex components in the plurality of complex components, thereby providing a mean cumulative function (MCF).

* * * * *